C. F. ECKART.
PROCESS FOR ENHANCING THE GROWTH OF SUGAR CANE.
APPLICATION FILED JULY 23, 1917.
1,296,173.
Patented Mar. 4, 1919.
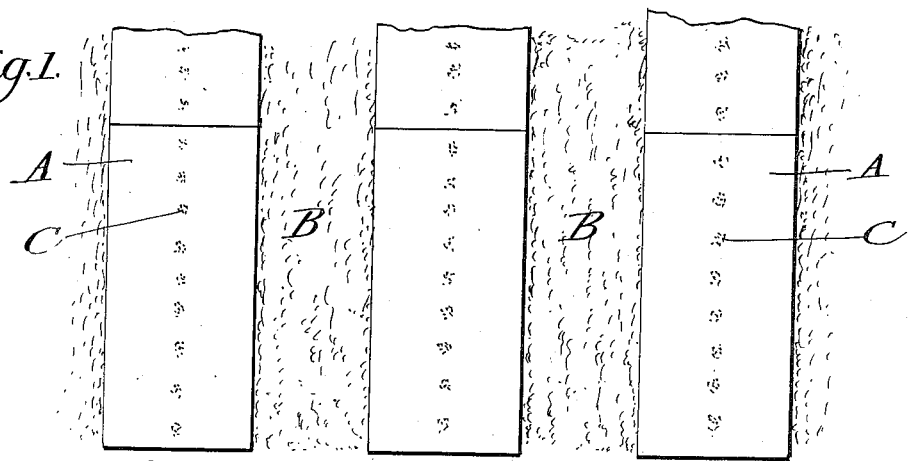
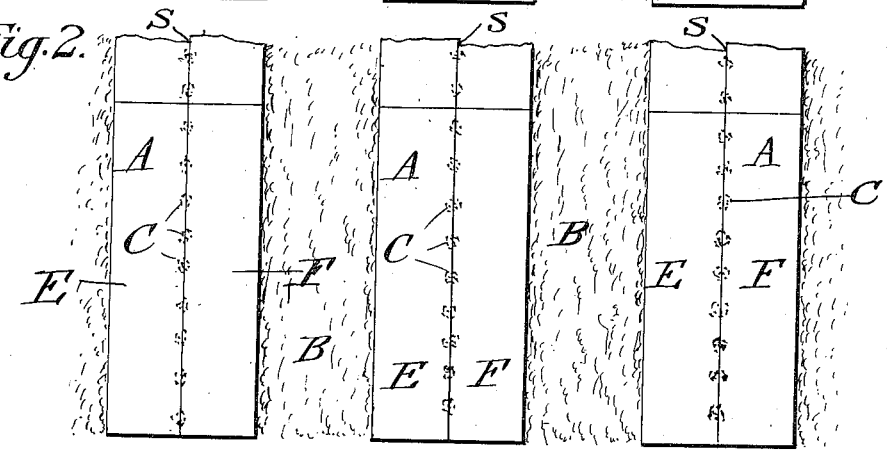
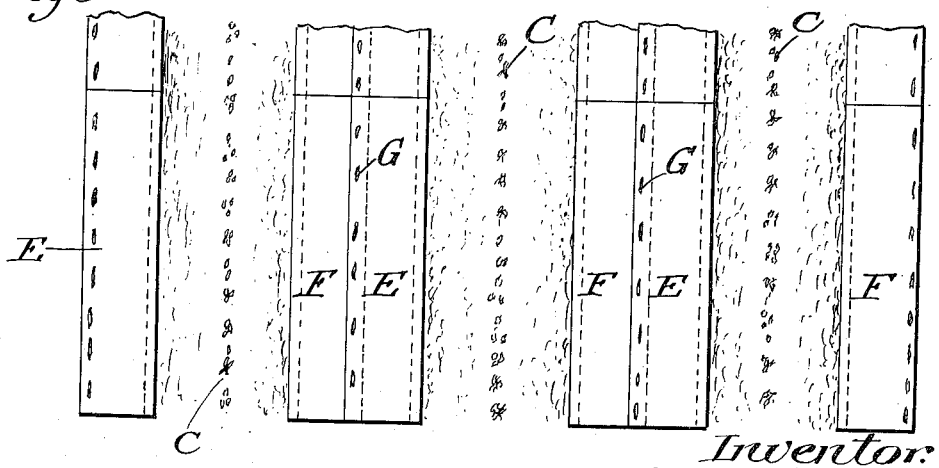

UNITED STATES PATENT OFFICE.

CHARLES FRANKLIN ECKART, OF OLAA, TERRITORY OF HAWAII.

PROCESS FOR ENHANCING THE GROWTH OF SUGAR-CANE.

1,296,173.　　　　　Specification of Letters Patent.　　Patented Mar. 4, 1919.

Application filed July 23, 1917. Serial No. 182,205.

*To all whom it may concern:*

Be it known that I, CHARLES F. ECKART, a citizen of the United States, and resident of Olaa, Territory of Hawaii, have invented certain new and useful Improvements in Processes for Enhancing the Growth of Sugar-Cane; and I do hereby declare the following to be a full, clear, and exact description of the invention, such as will enable others skilled in the art to which it appertains to make and use the same.

This invention relates to a process for enhancing the growth of sugar cane and is in the nature of an improvement on the process described and claimed in my Patent Number 1,227,898, dated May 29, 1917.

The process described and claimed in the above mentioned patent has for its object to permit the growth of "ratoon cane" unhampered by weeds in the cane row. This result is brought about generally, as set forth in said patent, by superimposing on the rows of stubble, a cover which is pervious to the cane and impervious to the weeds.

The object of the present invention resides in the provision of an improved process for permitting the ratoon cane to grow unhampered by weeds in the rows and for preventing the growth of and destroying the weeds between the rows so that the growth of the ultimate cane is greatly enhanced.

In carrying out the present process, the cane refuse or trash is first raked from the rows of stubble which remain after the harvesting of the previous crop, and is deposited in the intervening spaces between the rows. After the refuse has thus been cleared from the rows a dressing of fertilizer is applied to the rows, preferably, but it is to be understood that the application of this fertilizer is not absolutely essential to the success of the process. The strips of paper or fabric are then placed over the rows longitudinally so that they are superimposed on the stubble or the overlying soil, This paper or fabric is similar to that used in carrying out the process described in the above referred to patent, being non-waterproof, partially or wholly waterproof as the occasion requires and being of convenient lengths. This covering may either be rosin sized paper, tar felt or any other suitable paper which is of such a character that the spear-like and rigid shoots will penetrate the same.

After the shoots have been permitted to grow for a period of about one month to six weeks, during which period most of the shoots will have penetrated the cover, the cover is slitted along a longitudinal center line, the slitting being done by means of a knife or other suitable means. Each cover, therefore, becomes divided into two parts which lie in longitudinal relation to the rows so that the inner edges of the parts are in meeting relation and the outer edges are secured to the ground, as in the patent above referred to, on the sides of the rows. The inner edges which are formed by the slitting operation are subsequently grasped and the parts of the cover are folded back upon themselves, the outer edges remaining secured to the ground, so that they will overlie the intervening spaces between the rows. Thus one part of the cover of one row will overlie a portion of the adjacent space and the other part of the cover of the adjacent row will overlie the remaining part of the space between the rows. The covers may be of such width that when they are folded back in the manner described the edges of the portions of the covers will overlap. This will result in the closing of most of the holes which have been formed by the penetrating cane shoots, since these holes will be largely in the overlapping portion of the cover. However, if the covers are not of sufficient width so that the folded portions will overlap, the spaces between the adjacent edges of these folded portions will not be particularly detrimental to the process as will later appear.

In the drawing Figure 1 illustrates the manner in which the covers are placed upon the rows of stubble, and in this figure the covers are indicated by the reference character A, while the intervening spaces are indicated by the reference character B, and the stubble or cane shoots are indicated by the character C.

Fig. 2 illustrates the next step of the process which consists of slitting the covers longitudinally, and in this figure the parts which correspond to the parts in Fig. 1 are illustrated by similar characters, while the slits are indicated by the reference character S, and the portions of the covers which result from the slitting operation are indicated by the characters E and F.

Fig. 3 illustrates the final step of the process, which consists in folding the portions of the covers back upon themselves, and in this figure the adjacent edges of these portions are indicated as overlapping. The cane rows are indicated by the character C, the intervening spaces between the rows by the character B, the portions of the covers by the characters E and F, and the means for securing the edges of the portions which overlie the spaces between the rows, by the character G.

From these drawings it will be clear that the covers are first placed on the rows, are then slitted longitudinally and the resulting portions are folded back upon themselves to cover the intervening spaces between the rows.

There is no difficulty in accomplishing this latter operation since the period during which the covers are left on the rows is such that an expansion of the cane shoots will not take place to a deterrant extent. As the inner edges of the portions of the covers are grasped and the portions are folded back upon themselves, the covers will tear laterally along fairly straight lines and will pass off of the penetrating shoots.

During the period of a month or six weeks while the covers are on the rows, the cane will be permitted, as before stated, to pass through the covers and those weeds which started a growth will have been destroyed. Furthermore, the weed seeds which are in the rows are caused to germinate rapidly, due to the radiation of the solar heat through the covers, so that the resulting weeds are destroyed during this period of a month or six weeks.

Of course in this period the weeds in the spaces between the rows attain somewhat of a growth, but as soon as the covers are folded to overlie these spaces these weeds are smothered and consequently destroyed. Where the edges of the portions of the covers overlap, as has been stated before, the holes which are formed by the penetrating cane are for the most part covered up, since these holes occur chiefly along the center line of the covers before they have been slitted. Even if some of the holes caused by the penetrating shoots are not covered and weeds find a way through these holes, the growth of these weeds and the number of the same will be practically negligible, so that it will not affect the cane to any appreciable extent.

However, even if the covers are so narrow that the portions will not overlap when folded and narrow exposed spaces are in consequence left between the edges of folded portions, the weeds which would grow in these spaces would not be considerable and would not affect the cane to any appreciable extent.

It will thus be seen that the covers are first used to enhance the growth of the cane by destroying and preventing the growth of weeds in the cane rows and are then used to destroy and prevent a harmful growth of weeds between the rows, and a very economical method of enhancing the growth of the cane is the ultimate result.

While I have described the process as being carried out in connection with ratoon cane, it is to be understood that it may be successfully carried out in connection with the cane which sprouts after planting. The process may also be carried out after young or immature cane has been cut, as it ofttimes is, for agricultural or economical purposes.

What I claim is:—

1. A process for enhancing the growth of rows of sugar cane which consists in applying fertilizer to the rows of cane, superimposing covers on the rows, which covers are pervious to the cane and impervious to the weeds, slitting the covers longitudinally and folding the resulting portions to overlie the spaces between the rows.

2. A process for enhancing the growth of rows of sugar cane which consists in applying fertilizer to the rows of cane, superimposing covers on the rows, which covers are pervious to the cane and impervious to the weeds, attaching the covers to the ground, slitting the same longitudinally and folding the resulting portions to overlie the intervening spaces between the rows.

3. A process for enhancing the growth of rows of sugar cane which consists in superimposing covers on the rows of cane, which covers are pervious to the cane and impervious to the weeds, securing the covers to the ground, slitting the same longitudinally and folding the resulting portions to overlie the spaces between the rows.

4. A process for enhancing the growth of rows of sugar cane which consists in clearing the rows of trash, applying fertilizer to the rows, superimposing covers on the rows, which covers are pervious to the cane and impervious to the weeds, slitting the covers longitudinally and folding the resulting portions to overlie the spaces between the rows.

5. A process for enhancing the growth of rows of sugar cane which consists in clearing the rows of trash, superimposing covers on the rows, which covers are pervious to the cane and impervious to the weeds, slitting the covers longitudinally and folding the resulting portions to overlie the spaces between the rows.

6. A process for enhancing the growth of rows of sugar cane which consists in preventing and arresting the growth of weeds and permitting the continuous growth of the cane in the rows by placing covers on the rows, which covers are pervious to the cane and impervious to the weeds, and in destroying the weeds between the rows, by folding the said covers back upon the spaces between the rows.

7. A process for enhancing the growth of rows of sugar cane which consists in preventing and arresting the growth of the weeds in the rows of sugar cane for a period sufficient to permit the weed seeds to germinate and the resulting weeds to be smothered, and in subsequently destroying the weeds between the rows.

In testimony whereof I affix my signature.

CHARLES FRANKLIN ECKART.